Figure 1:
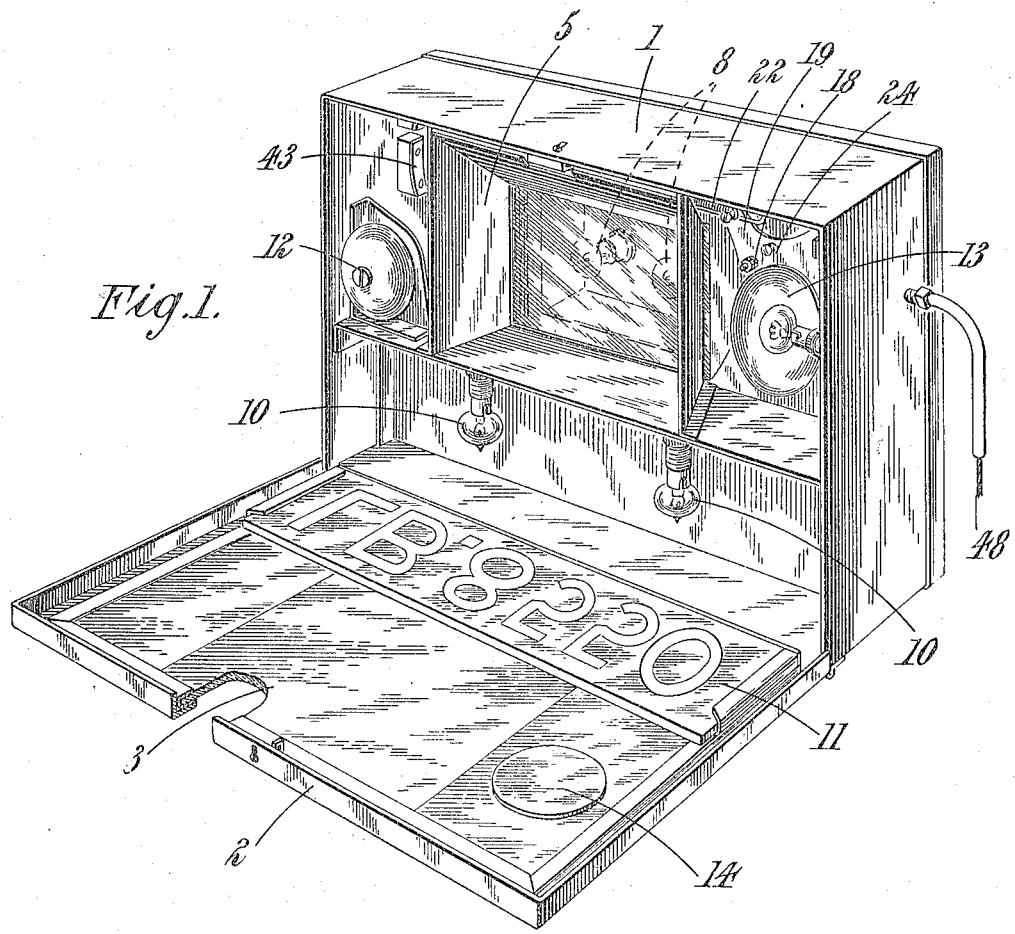

J. H. FAULKNER.
INDICATING DEVICE FOR AUTOMOBILES AND OTHER ROAD VEHICLES.
APPLICATION FILED SEPT. 12, 1910.

1,145,760.

Patented July 6, 1915.
6 SHEETS—SHEET 1.

J. H. FAULKNER.
INDICATING DEVICE FOR AUTOMOBILES AND OTHER ROAD VEHICLES.
APPLICATION FILED SEPT. 12, 1910.

1,145,760.

Patented July 6, 1915.
6 SHEETS—SHEET 2.

Fig. 2.

J. H. FAULKNER.
INDICATING DEVICE FOR AUTOMOBILES AND OTHER ROAD VEHICLES.
APPLICATION FILED SEPT. 12, 1910.
1,145,760.
Patented July 6, 1915.
6 SHEETS—SHEET 3.
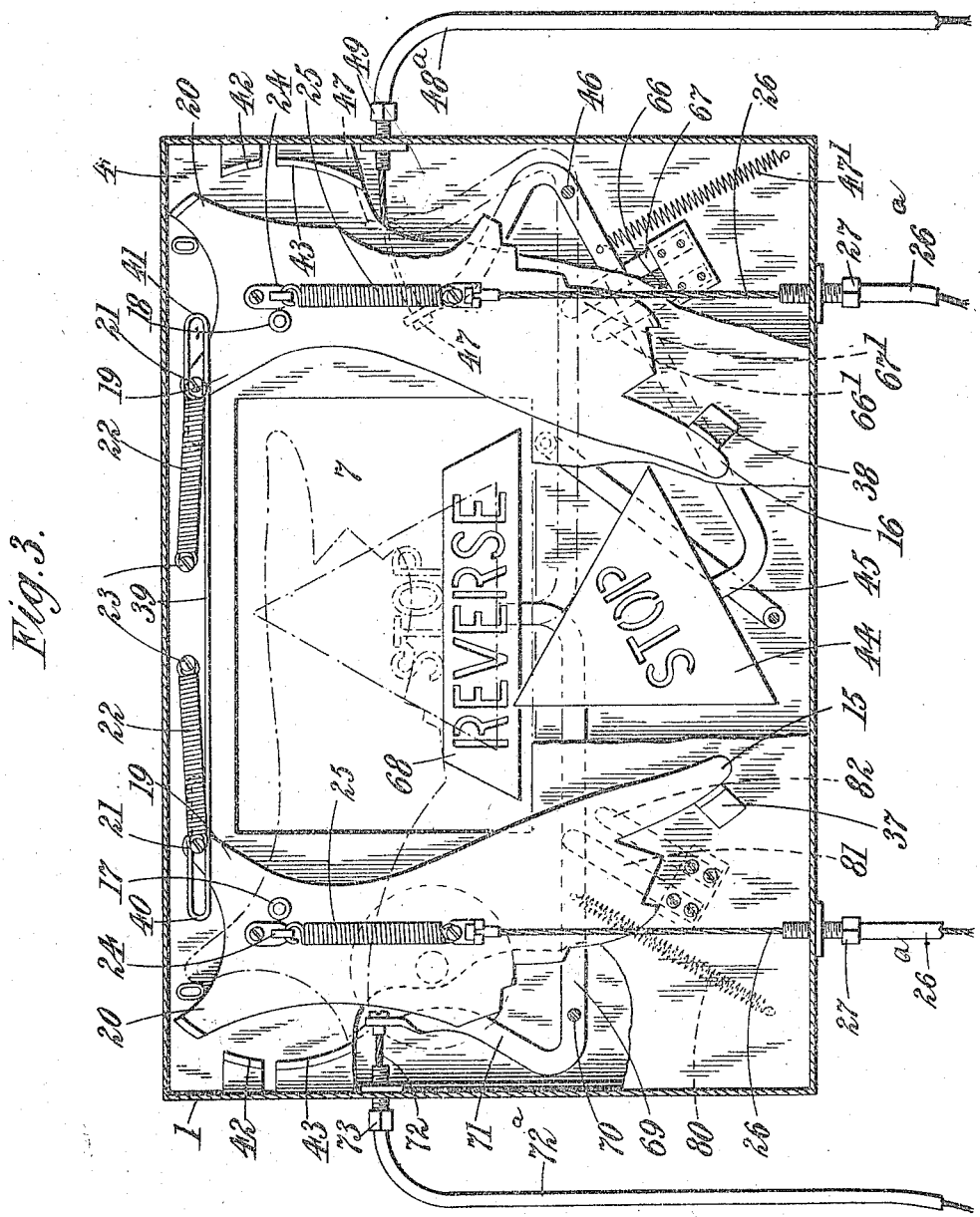

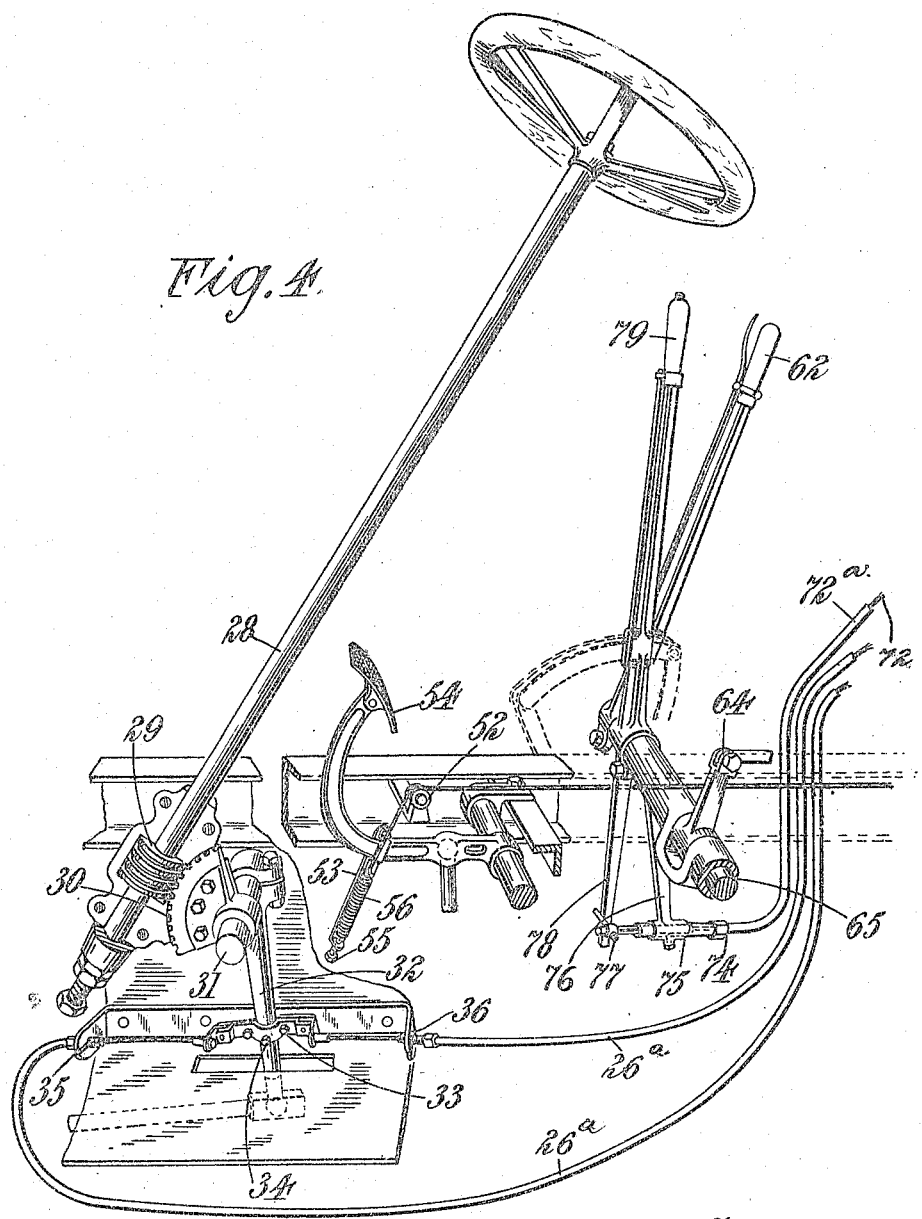

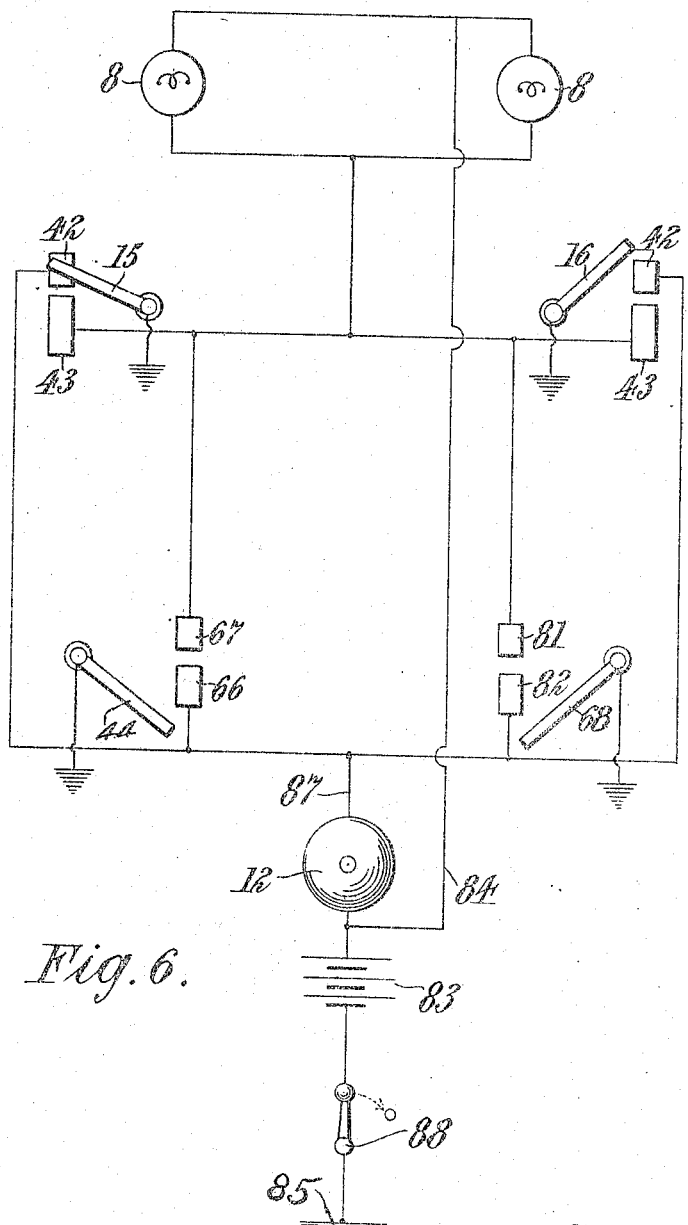

UNITED STATES PATENT OFFICE.

JOHN HENRY FAULKNER, OF LONDON, ENGLAND.

INDICATING DEVICE FOR AUTOMOBILES AND OTHER ROAD-VEHICLES.

1,145,760.  Specification of Letters Patent.  Patented July 6, 1915.

Application filed September 12, 1910. Serial No. 581,500.

*To all whom it may concern:*

Be it known that I, JOHN HENRY FAULKNER, a subject of the King of England, residing in London, England, have invented certain new and useful Improvements in Indicating Devices for Automobiles and Other Road-Vehicles, of which the following is a specification.

The present invention relates to indicat ing devices for use in connection with automobiles or other road vehicles and more particularly to devices of the type described in my prior British Patent No. 16,293 of 1908. In the patent referred to I have described and claimed an indicating device for automobiles in which indicating hands or other signals are automatically operated from the steering mechanism to indicate the movement of the vehicle in one direction or an other. According to a modification a separate cautionary sign for indicating "slowing up" or "stopping" is employed, the cautionary sign being automatically operated by the application of the brake.

The present invention has for its object to modify and improve the indicating device above referred to for the purposes hereinafter more fully described.

My invention consists of the following improvements in indicating devices of the type above referred to: Instead of employing a separate panel or illuminable compartment for each signal, I employ only one panel or compartment at or in which a num ber of signals are individually and successively or in multiple displayed. I also provide a signal to indicate "reverse." Further features of my invention comprise a mechanical interlock between certain of the signals; mechanism for moving the signals to the full indicating position upon the motion of a control lever being initiated or only partially completed; a pivoted or swivel connection and an extensible member interposed between the signal to be actuated and the transmission rod or wire; a weather-proof casing and means external to the casing for adjusting the tension of the transmission rods or wires; a box or com partment having a movable cover or front containing a removable translucent number plate illuminable from within the box or compartment; an illuminating device rendered luminous by the movement of each signal while the signal is in the indicating position; mechanism for actuating one signal from a plurality of points; mechanism for multiplying the movement of the steering device and rods or wires coöperating with extensible members for transmitting the multiplied motion to the signals, and other features all of which will be more fully described hereinafter.

My invention is illustrated in the accompanying drawings, in which—

Figure 5:
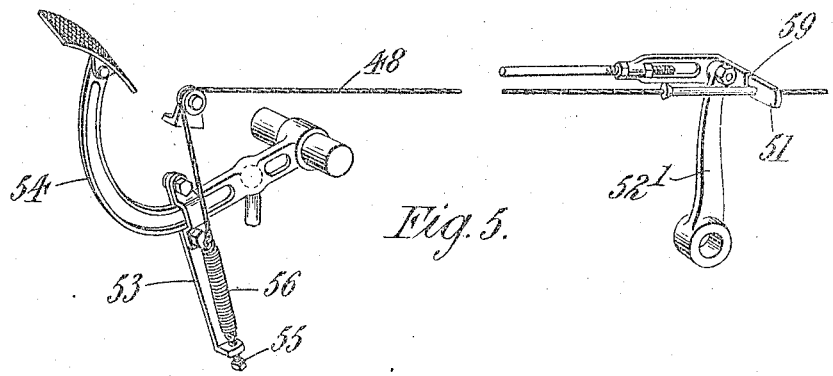
Figure 4:
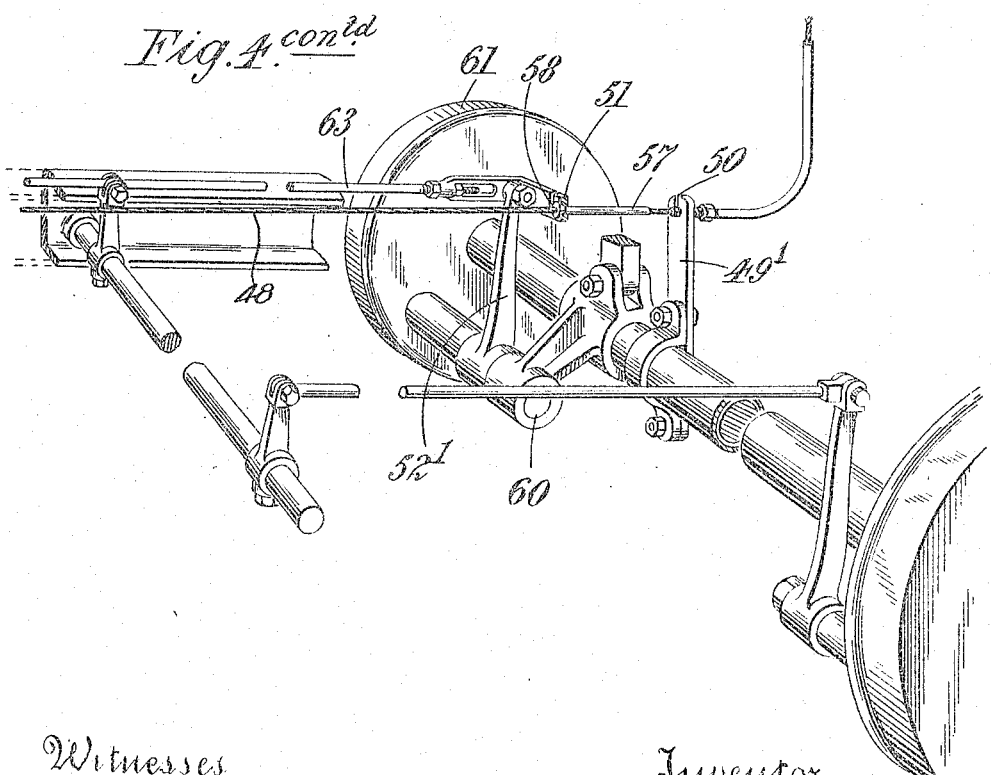

Figure 1 is an elevation in perspective of my improved indicator; Fig. 2 is a section thereof; Fig. 3 is an elevation of the signals and transmission wires; Fig. 4 is an elevation in perspective of the transmission mechanism; Fig. 5 is a detail of Fig. 4, and Fig. 6 is a detail of the electrical connections.

Referring to Fig. 1 of the drawings, the box or casing 1 is provided with a hinged cover 2 having an opening 3, said cover making a rain and dust proof joint with the box or casing 1. Within the box is located a partition or septum 4 (see Fig. 3) which may conveniently carry the various signals hereinafter described. Located between the partition 4 and the cover 2 is a frame 5 having a box-like portion immediately behind the opening 3 in the cover of the box and arranged opposite an opening 6 in the partition 4. The opening in the partition 4 is covered by a sheet of translucent material 7 behind which are located one or more illuminating devices 8 hereinafter referred to. The illuminating devices, such as electric lamps, are located in a box-like extension 9 carried by the rear cover $9^1$ which is removably secured by screws $9^2$ and $9^3$. It should be noted that the partition or septum 4 is also removably secured by means of screws $4^1$. Beneath the box-like member 5 are located one or more illuminating devices 10 and the hinged front or cover 2 carries a sheet of translucent material 11 which in the present instance constitutes a number plate. This plate 11, as will be seen from Fig. 1, may be readily removed and replaced. At one side of the box-like frame 5 is located an electric bell or other audible signal 12 and at the opposite side a rear light 13 which is visible through an opening or window 14 in the cover 2.

Referring now more particularly to Figs. 3, 4 and 5, it will be seen that the partition 4 carries two indicating hands or signals 15 and 16 which are pivoted at 17 and 18 respectively. These signals have projecting members 19 and 20 respectively, the former carrying pins 21 to which are secured springs 22 secured at their other ends to the partition 4 by means of pins 23. The signals 15 and 16 are each provided with swivels or pivoted hooks 24 connected through the intermediary of extensible members 25 to transmission wires 26 which are preferably of the Bowden wire type. These transmission wires are inclosed within tubes 26ᵃ that pass through the bottom of the box or casing 1 to which they are secured by means of adjusting screws 27. The indicating hands or signals 15 and 16 are actuated so as to assume the indicating position shown in dotted lines in front of the translucent screen 7 by means of a device actuated by the steering mechanism and shown in Fig. 4 of the drawings. Referring to this figure it will be seen that the steering column 28 carries a worm-wheel 29 which engages with a segmental gear 30 carried by a stub shaft 31. The rod 32 is secured to the shaft 31 and in turn is provided with a bracket or clamping member 33 secured thereto by means of a set-screw or other equivalent device 34. This bracket 33 is adjustably mounted so that it may be moved toward or away from the stub shaft 31. The respective transmission wires 26 are secured to the respective ends of the bracket 33 and these transmission wires pass through slotted guides 35 and 36, to which the ends of the tubes 26ᵃ carrying the transmission wires are fastened by adjustable screws.

The operation of the signals is as follows: Assuming the vehicle is being steered either to right or left, the worm-wheel 29 rotates the segmental gear 30 and rocks the shaft 31. In so doing the rod 32 is rocked and one or the other of the transmission wires 26 is pulled away from the indicating device and that particular signal to which the rod is connected is moved into the indicating position. It will be seen that for a small movement of the steering column a large movement of the transmission wire may be obtained, and by shifting the bracket 33 in one direction or the other the amount of pull on the respective transmission wires may be increased or diminished. The object of multiplying the motion in the manner above described is as follows: It has been found that when an automobile is making a turning movement that the indicating hand or signal does not at once assume the full indicating position, but does so only progressively in such a manner that the turning movement is always complete before the indicating hand has assumed its full indicating position. It is desirable that immediately the turning movement is initiated or only partially completed that the indicating hand or signal should assume the full indicating position. In other words it is desirable that the signals should be rendered what may be termed "dead beat" in their action. In order to attain this end I provide extensible members such as the springs 25 between the connections 24 and the wires 26. The arrangement is such that the initial movement of the steering column produces a large motion in the transmission wires 26 with the result that one or the other of the indicating hands is at once moved into the indicating position. The continued movement of the transmission wire 26 is then compensated by reason of the springs 25 extending. In this respect it will be seen that as either of the hands 15 or 16 are moved the swivels or pivoted hooks 24 always point or hang in the same direction downwardly.

It might happen that after being actuated one of the signals would remain in the indicating position, and to provide against this emergency the springs 22 are employed. These springs normally tend to keep the signals 15 and 16 in their nonindicating positions against the stops 37 and 38. The signals 15 and 16 are mechanically interlocked by means of a rod 39, which rod has looped extremities 40 and 41 in which the pins 21 carried by the members 19 are free to slide. When one signal is raised to the indicating position the pin 21 is moved away from the center of the apparatus and the spring 22 is stretched while at the same time the pin 21 engages the looped extremity 40 or 41 of the rod 39 and in so doing moves this rod bodily to one side. The other looped extremity of the rod 39 now engages with the other pin 21, that is to say, if the indicator or signal which carries the latter pin has by any chance retained its indicating position it will be seen that the action of the interlock 39 is to positively return one signal to its non-indicating position when the other signal is actuated and raised into its indicating position. The action of this interlock is of course reciprocal.

The members 20 of the signals 15 and 16 engage electric contacts 42 and 43 respectively. These contacts will be referred to later.

As in my prior patent. I also provide a cautionary signal to indicate when the vehicle is slowing up or to be stopped. This signal is represented in Fig. 3 by a triangular disk 44 with letters cut therein. This triangle is carried by a lever 45 pivoted at 46 and provided with a member 47 to which a transmission wire 48 is secured. Said wire 48 works in a tube 48ᵃ. A spring 47¹ is secured at one end to the partition 4 and at the other end to the lever 45 so that the latter is normally always held down in the non-indicating position. This transmission wire passes through the indicator casing and through an adjusting screw 49 located outside the box and through a guide block 49¹ slotted at 50 and also through a slotted guide 51 to a guide pulley or fair lead 52 carried by the chassis from whence it passes to a bracket 53 carried by the foot brake lever 54—which actuates the engine brake by means of a rod—to which it is secured by means of an adjusting screw 55 through the intermediary of an extensible member such as a spring 56. This arrangement is shown more clearly in Fig. 5.

The transmission wire 48 is provided with a sleeve 57 having a boss or enlarged portion 58 at one extremity or at any other convenient point. This sleeve 57 is rigidly connected with the wire and slides in the groove 59 (see Fig. 5) in the bracket 51 which is secured to an arm 52' keyed to the shaft 60 which operates the cam within the brake drum 61. The arm 52' is connected with the hand brake lever 62 by means of the rod 63 and arm 64 mounted upon the shaft 65 in the usual manner. It will be seen that if the foot brake is actuated, the signal indicating "stop" will be elevated into the position shown in dotted lines and similarly that if the hand brake 62 is applied the arm 52' will be rocked and the bracket 51 will engage the projection 58 on the sleeve 57 and pull the transmission wire toward the front of the car, thus actuating the triangular signal. According to this arrangement a single signal may be controlled from two different points, namely, the brake pedal and the brake lever. Fig. 4 shows the foot and hand brakes in the off position, while Fig. 5 shows the foot brake in the on position.

Reverting to the lever 45 which carries the triangular cautionary signal, it will be seen that this lever passes beneath contacts 66 and 67. In the position shown in full lines in Fig. 3, the lever 45 does not make contact with the contacts mentioned, but when the signal is actuated and the lever rocked about its axis 46 it engages first the tip 66' of the contact 66 and then the tip 67' of the contact 67, in which position it remains during the whole time the signal is in the indicating position. The contact made at 66' is only momentary and will be referred to hereinafter in connection with Fig. 6.

As already pointed out, according to the present invention I employ an additional signal indicating "reverse". This signal is shown in full lines in Fig. 3 and is indicated by 68, being carried by a lever 69 pivoted at 70 and having an arm 71 to which is secured a transmission wire 72 working in a tube 72ᵃ that passes through the casing 1 and is secured thereto by means of adjusting screw 73. This transmission wire is connected to a sleeve 74 which is journaled or adapted to slide in a barrel 75 carried by a bracket 76 suitably secured to the chassis; the transmission wire 72 passing through the sleeve 74 is secured at 77 to the lower end 78 of the control lever 79 mounted upon the shaft 65. When this lever is drawn into the "reverse" position it will be seen that the signal indicating "reverse" is lifted into the visible position. Normally, this signal is not visible and is held in its lowermost position by a spring 80 or other equivalent device. The lever 69 engages with contacts 81 and 82 in substantially the same manner as the lever 45 engages with the contacts 66 and 67. The indicating hands 15 and 16, the cautionary signal 44 or the "reverse" signal 68 are all mounted in front of the translucent material in the opening 7 so as to be visible during the day time. The words "Stop" and "Reverse" must be formed by perforations in the respective signals so as to be visible at night and in such relative positions that when the car is at rest and just about to be reversed, the signals "Stop" and "Reverse" are both visible.

The operation of the device will now be described more particularly with reference to Fig. 6, which is a diagrammatic representation of the respective contacts and circuits including the lamps and an electric bell. In this figure the reference numerals correspond with those shown in Figs. 1 and 3, while 83 represents a source of electric current. This source of current may be a small generator on the car or a storage battery as the case may be. The contacts 42, 43, 66, 67, 81 and 82 are all insulated, while the contacts 15, 16, 44 and 68 remain uninsulated, that is to say earthed. One pole of the battery is connected to a conductor 84 with the lamps 8, which are connected in parallel and with the contacts 43, 67 and 81 which are in series with the lamps. The other pole of the battery is earthed at 85. The bell 12 is connected in circuit by means of a conductor 87 which also connects the insulated contacts 42, 66 and 82 in parallel. Assuming, for instance, that a vehicle carrying the indicator is about to turn to the right, the first motion of the steering column causes the signal 15 to take the position shown in Fig. 3 in dotted lines. In passing into this position the extremity 20 of signal 15 makes electrical contact first with the contact 42 whereby a circuit through the bell is completed and the latter gives an audible signal that the car is about to turn and subsequently makes contact with contact 43 during the time the signal is in its indicating position. As soon as contact is made at 43, both lamps 8 behind the translucent window are illuminated and remain so until the signal drops. The same thing happens in connection with the signal 16 or either of the signals 44 or 68, that is to say each time a signal is actuated a bell is rung momentarily and the illuminating lamps are lighted during such time only as the signal is visible. I provide a switch 88 for cutting out the battery for daylight operation.

Another feature of my invention resides in the employment of the box or compartment containing the lamps 10 located behind the number plate 11. These lamps may be oil, electric or gas lamps as desired.

Although I have hereinbefore described the preferred form of carrying out my present invention I do not wish to be limited to the specific arrangements shown and described but wish it to be understood that various modifications may be made to suit differing conditions.

What I claim as my invention and desire to secure by Letters Patent is:—

1. In an indicator for vehicles, the combination of a steering gear, a casing provided with an exposing aperture, a plurality of independently mounted signaling devices operable to move to a common indicating position at said exposing aperture, means for connecting said signaling devices to be actuated from said steering gear, spring means connecting said connecting means with said signaling devices, adapted to move said signaling devices into full indicating position upon a small movement of said steering gear, and spring means connecting said indicating devices with said casing adapted to return said indicating devices into non-indicating position, substantially as described.

2. In an indicator for vehicles, the combination of a casing, provided with an exposing aperture, a plurality of independently pivotally mounted signaling devices operable to move to a common indicating position at said exposing aperture, means for actuating said signaling devices, spring means connecting said actuating means and said signaling devices adapted to move said signaling devices into full indicating position upon a small movement of said actuating means, spring means connecting said indicating devices with said casing adapted to return said indicating devices into non-indicating position, and a bar provided with looped ends having loose engagement with said indicating devices, said bar adapted to move one of said indicating devices into non-indicating position when the other of said devices is moved into indicating position, in the event of failure of operation of said means for returning said devices into non-indicating position, substantially as described.

3. In an indicator, the combination of a supporting structure; a pair of indicating devices pivotally mounted on said structure; means for actuating said indicating devices; and a bar having loose connection with each of said devices and adapted to move one of said devices into non-indicating position when the other of said devices is moved to indicating position, substantially as described.

4. In an indicator, the combination of a supporting structure; a pair of indicating devices pivotally mounted on said structure; means for moving said devices into indicating positions; means for positively moving said devices into non-indicating positions; a bar provided with looped ends having loose engagement with said indicating devices, said bar adapted to move one of said indicating devices into non-indicating position when the other of said devices is moved into indicating position in the event of failure of operation of said means for positively moving said devices into non-indicating positions, substantially as described.

5. In an indicator for motor driven vehicles having a foot brake and a hand brake for the wheels, the combination of a signaling device, a connecting means between the foot brake and the signaling device, a bracket connected to the hand brake; and a member fixedly mounted on said connecting means adjacent said bracket, said bracket adapted to engage with the fixed member to actuate the signaling device through said connecting means, substantially as described.

6. In an indicator for motor driven vehicles having a foot brake and a hand brake for the wheels, the combination of a signaling device, a wire connecting the foot brake and the signaling device, an apertured bracket connected to the hand brake, and a sleeve fixedly mounted on said connecting wire and movable through the aperture of the bracket, said sleeve having a part adapted to be engaged by the bracket to actuate the signaling device through said connecting wire, substantially as described.

In testimony whereof I have signed my name to this specification in the presence of two subscribing witnesses.

JOHN HENRY FAULKNER.

Witnesses:
 HARRY B. BRIDGE,
 PERCY G. HEWITT.